United States Patent
Foege et al.

(10) Patent No.: US 9,435,285 B2
(45) Date of Patent: Sep. 6, 2016

(54) CONTROL SYSTEM FOR ENGINE

(71) Applicants: Aaron Foege, Westmont, IL (US); David T. Montgomery, Edelstein, IL (US); Farhan Devani, Morton Grove, IL (US); Scott B. Fiveland, Metamora, IL (US)

(72) Inventors: Aaron Foege, Westmont, IL (US); David T. Montgomery, Edelstein, IL (US); Farhan Devani, Morton Grove, IL (US); Scott B. Fiveland, Metamora, IL (US)

(73) Assignee: Electro-Motive Diesel, Inc., La Grange, IL (US)

( * ) Notice: Subject to any disclaimer, the term of this patent is extended or adjusted under 35 U.S.C. 154(b) by 947 days.

(21) Appl. No.: 13/692,595

(22) Filed: Dec. 3, 2012

(65) Prior Publication Data

US 2014/0150749 A1 Jun. 5, 2014

(51) Int. Cl.
*F02B 11/00* (2006.01)
*F02D 41/30* (2006.01)
*F02D 19/06* (2006.01)
*F02D 41/00* (2006.01)

(52) U.S. Cl.
CPC ....... *F02D 41/3064* (2013.01); *F02D 19/0613* (2013.01); *F02D 19/0615* (2013.01); *F02D 19/0621* (2013.01); *F02D 41/0025* (2013.01); *F02D 19/0642* (2013.01); *F02D 19/0649* (2013.01); *F02D 41/0027* (2013.01); *F02D 41/0087* (2013.01); *Y02T 10/36* (2013.01)

(58) Field of Classification Search
CPC ........... F02D 19/0613; F02D 19/0615; F02D 19/0621; F02D 41/3064; F02B 11/00
USPC .................... 123/27 GE, 525, 526, 575, 577
See application file for complete search history.

(56) References Cited

U.S. PATENT DOCUMENTS

| | | | |
|---|---|---|---|
| 4,278,064 A * | 7/1981 | Regueiro | F02D 19/0684 123/526 |
| 4,335,697 A | 6/1982 | McLean | |
| 4,489,699 A | 12/1984 | Poehlman | |
| 8,695,575 B2 * | 4/2014 | Nakayama | F02D 19/0647 123/525 |
| 2006/0101823 A1* | 5/2006 | Takemoto | B60K 6/24 60/716 |

* cited by examiner

*Primary Examiner* — Erick Solis

(57) ABSTRACT

A control system for an engine including a fuel delivery system and an ignition source is provided. The control system includes a detector, a processor, and at least one actuator. The detector is configured to sense a signal to change from a compression ignited fuel to a spark ignited fuel. The processor is configured to receive the signal from the detector and generate an actuation signal. The actuator is configured to receive the actuation signal, vary an operating speed of the engine, and selectively control at least one of the fuel delivery system and the ignition source.

17 Claims, 6 Drawing Sheets

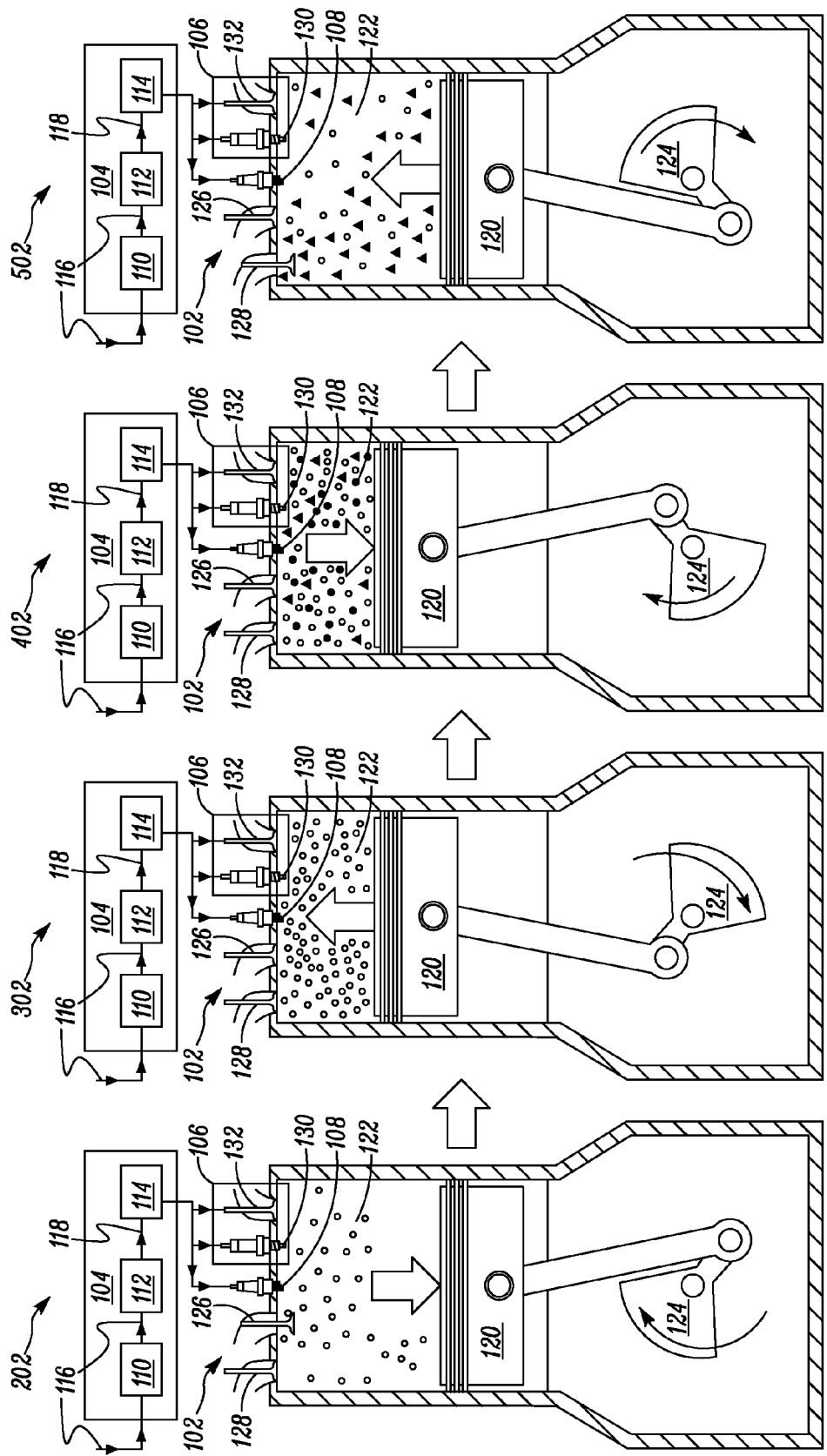

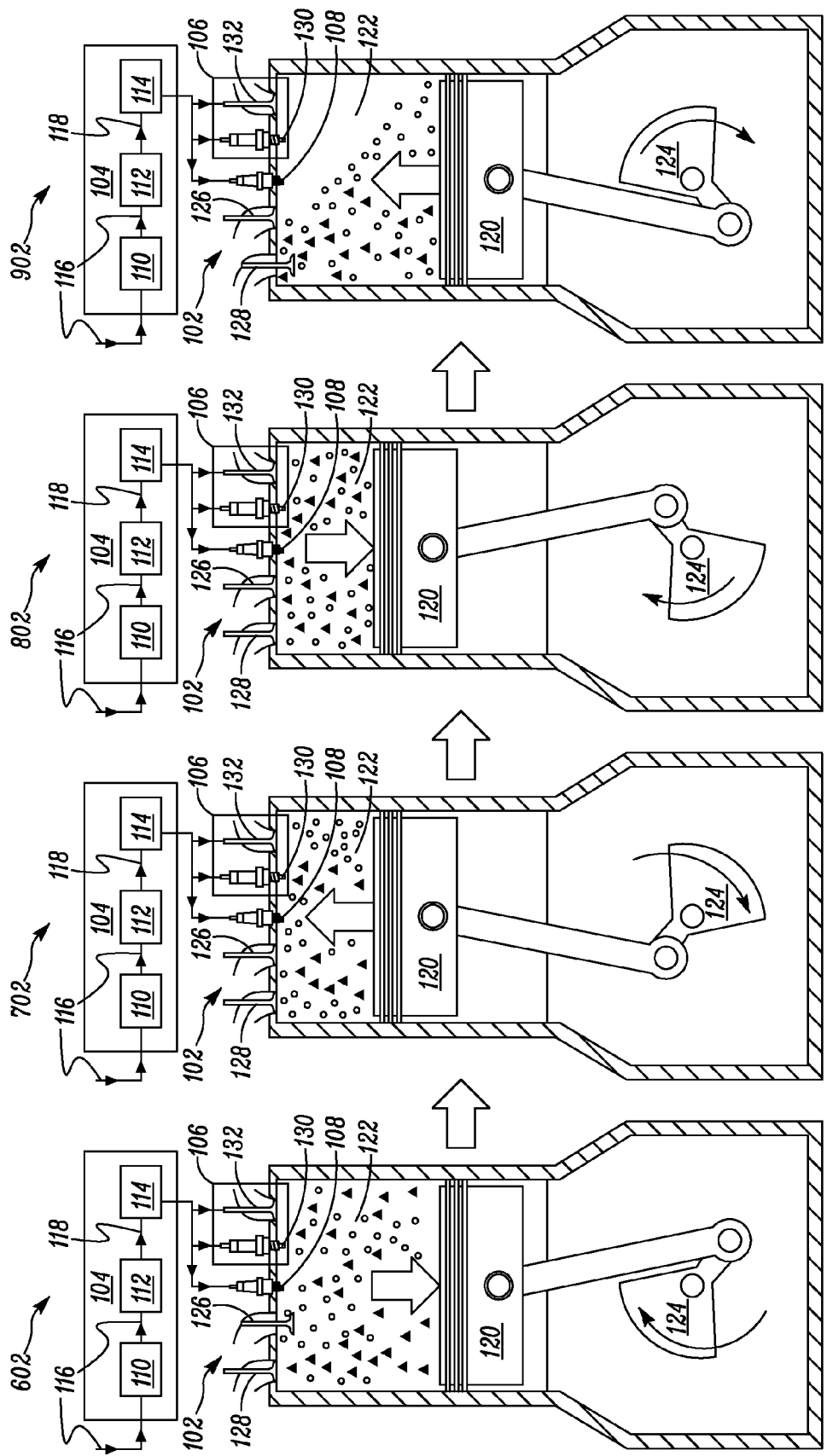

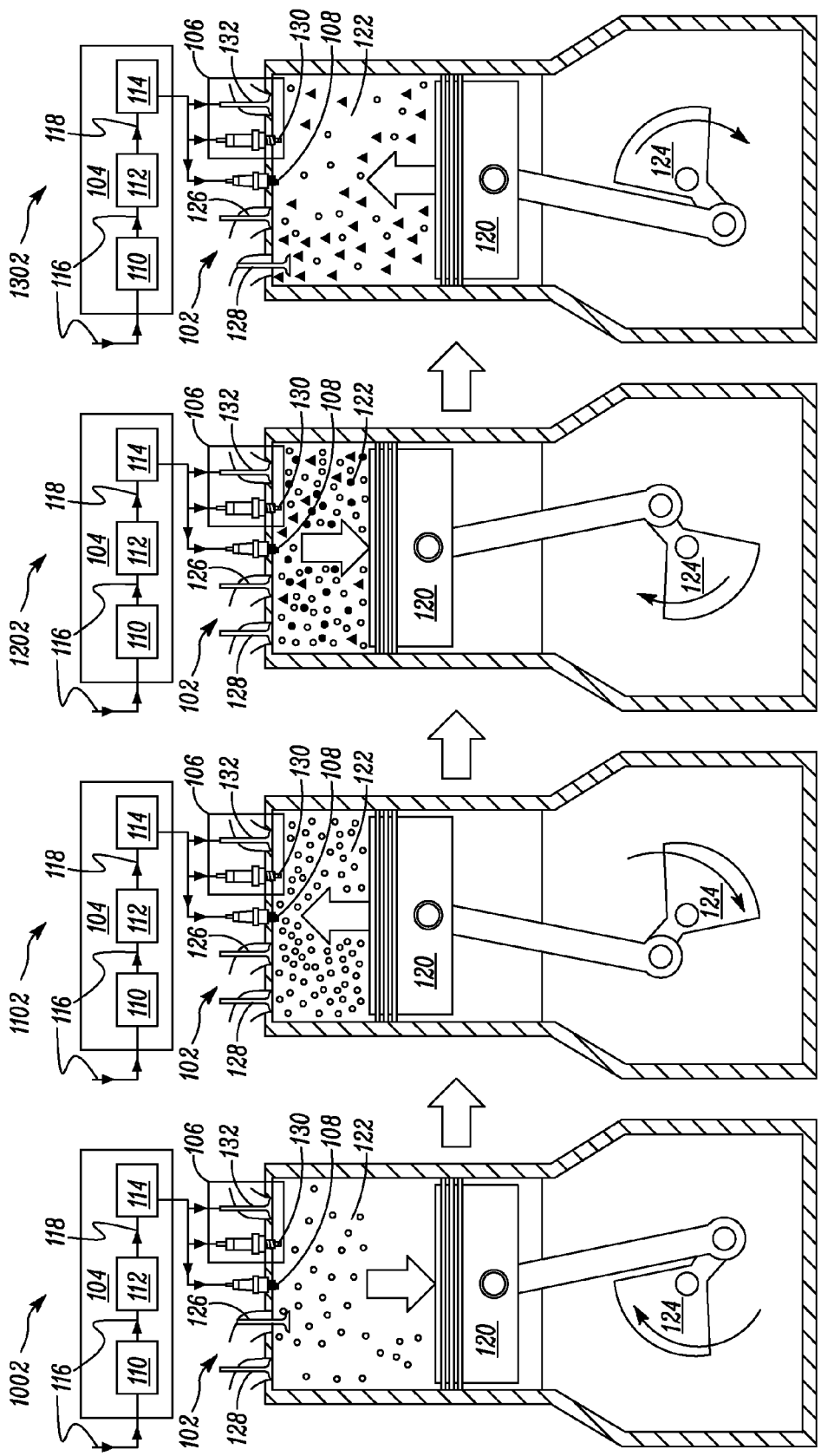

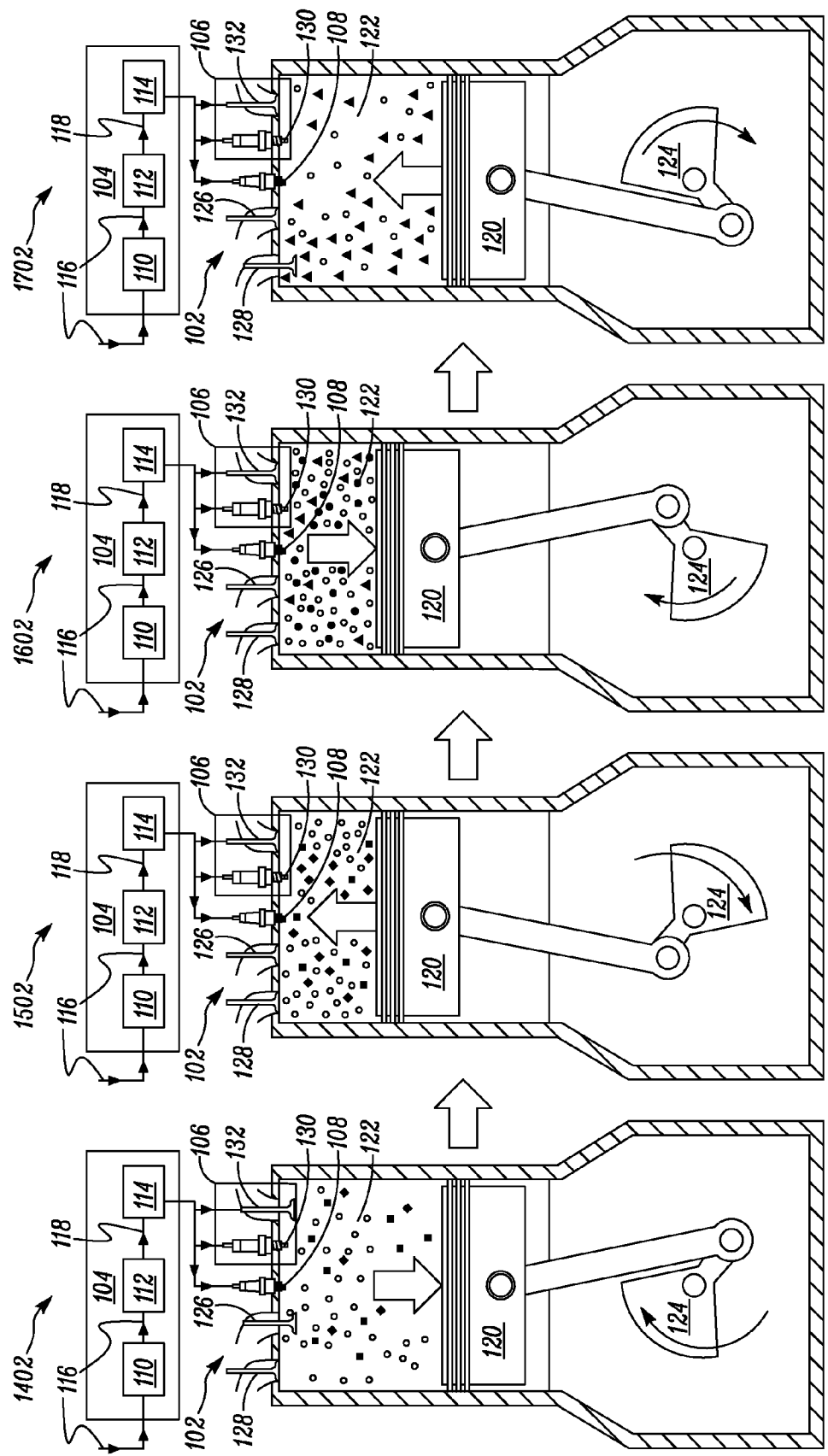

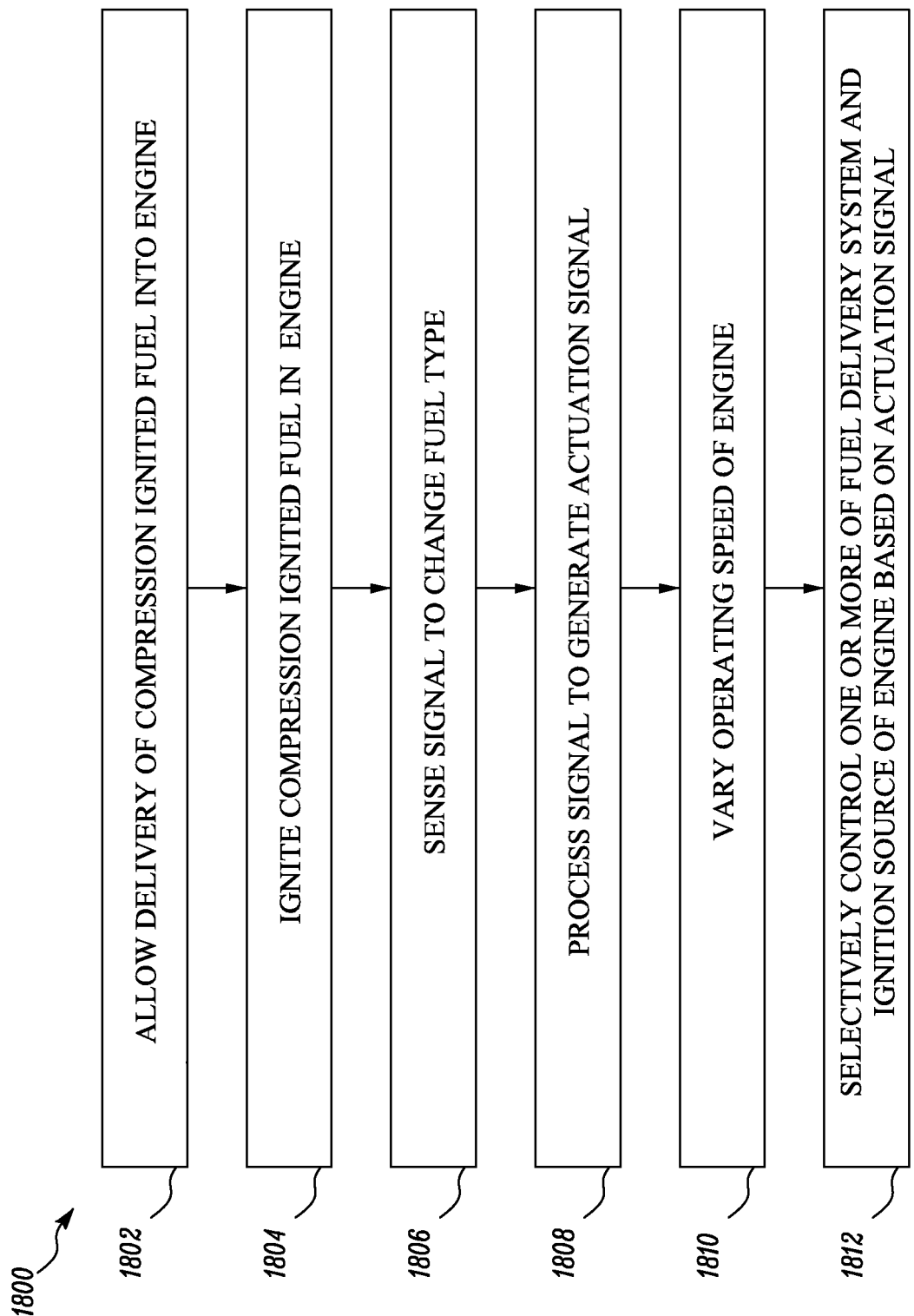

CONTROL SYSTEM FOR ENGINE

TECHNICAL FIELD

The present disclosure relates to a control system, and more particularly to a control system for an engine including a fuel delivery system and an ignition source.

BACKGROUND

Conventional changeover systems for engines may allow a change in fuel type input to the engine. However, in specific cases, when transitioning from a compression ignited fuel, such as diesel, to a spark ignited fuel, such as gasoline or natural gas, residual by-products resulting from the combustion of the compression ignited fuel may be left behind in a combustion chamber of the engine. Typically, pre-ignition characteristics of spark ignited fuels may be different from that of compression ignited fuels. The residual by-products left behind in the combustion chamber of the engine may cause detrimental effects such as knocking, or detonation from pre-ignition of the spark ignited fuel. Thus, the residual by-products may negatively impact transitioning from compression ignited fuels to spark ignited fuels within the engine and deteriorate engine performance.

U.S. Pat. No. 4,489,699 relates to an apparatus adapted for controlling operation of an internal combustion engine operable selectively on gaseous fuel or liquid fuel. A gaseous fuel supply line extends between the engine and a source of gaseous fuel. A liquid fuel supply line extends between the engine and a source of liquid fuel. A control for controlling supply of the gaseous fuel and the liquid fuel to the engine is provided. The control includes an operator controlled fuel selector switch movable between a gaseous fuel position and a liquid fuel position. In response to movement of the fuel selector switch from the gaseous fuel position to the liquid fuel position, liquid fuel flow is permitted through the liquid fuel supply line. Further, gaseous fuel flow may be continued through the gaseous fuel supply line until initiation of liquid fuel combustion. Thereafter, gaseous fuel flow may be prevented until the fuel selector switch is repositioned to the gaseous fuel position. In response to a movement of the fuel selector switch from the liquid fuel position to the gaseous fuel position, gaseous and liquid fuel flow is prevented until termination of the liquid fuel combustion. Thereafter, gaseous fuel flow is permitted until the fuel selector switch is repositioned to the liquid fuel position.

SUMMARY

In one aspect, the present disclosure provides a control system for an engine including a fuel delivery system and an ignition source. The control system includes a detector, a processor, and at least one actuator. The detector is configured to sense a signal to change from a compression ignited fuel to a spark ignited fuel. The processor is configured to receive the signal from the detector and generate an actuation signal. The actuator is configured to receive the actuation signal, vary an operating speed of the engine, and selectively control at least one of the fuel delivery system and the ignition source.

In another aspect, the present disclosure provides a power system including an engine and a control system. The engine includes a fuel delivery system and an ignition source. The fuel delivery system is configured to deliver at least one of a compression ignited fuel and a spark ignited fuel. The ignition source is configured to ignite one or more of the two fuel types. The control system is operatively connected to the engine and includes a detector, a processor, and at least one actuator. The detector is configured to sense a signal to change from the compression ignited fuel to the spark ignited fuel. The processor is configured to receive the signal from the detector and generate an actuation signal. The actuator is configured to receive the actuation signal, vary an operating speed of the engine, and selectively control at least one of the fuel delivery system and the ignition source.

In another aspect, the present disclosure provides a method of changing a fuel type in an engine. The method includes allowing delivery of a compression ignited fuel into the engine. The method includes igniting the compression ignited fuel in the engine. The method includes sensing a signal to change a fuel type. The method includes processing the signal to generate an actuation signal. The method includes varying an operating speed of the engine based on the actuation signal. The method includes selectively controlling one or more of a fuel delivery system and an ignition source of the engine based on the actuation signal.

Other features and aspects of this disclosure will be apparent from the following description and the accompanying drawings.

BRIEF DESCRIPTION OF THE DRAWINGS

FIGS. 2-5 are sectional views of an engine of the power system when the engine is operating on a compression ignited fuel;

FIGS. 6-9 are sectional views of the engine executing one or more motoring cycles;

FIGS. 10-13 is a sectional view of the engine showing an increased amount of compression ignited fuel;

FIGS. 14-17 is a sectional view of the engine operating on a spark ignited fuel; and FIG. 18 shows a method of changing a fuel type in the engine.

DETAILED DESCRIPTION

Figure 1:
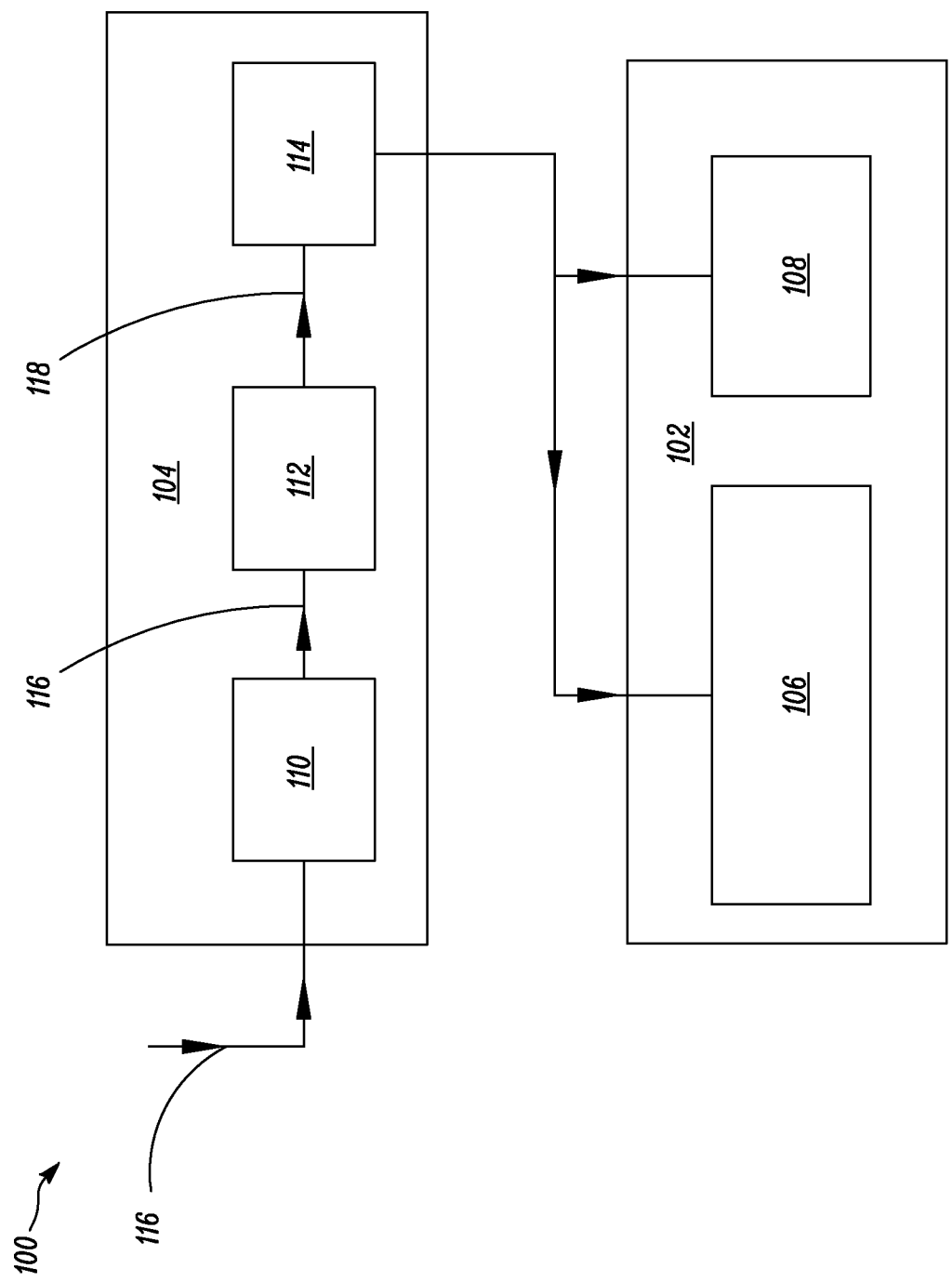
FIG. 1 is a schematic of a power system in accordance with an embodiment of the present disclosure.

The present disclosure relates to a control system for an engine including a fuel delivery system and an ignition source. FIG. 1 shows a schematic of a power system 100 in which disclosed embodiments may be implemented. The power system 100 includes an engine 102, and a control system 104. The engine 102 may be of any type. In one embodiment, the engine 102 may be used to drive power generating assemblies such as generators. In other embodiments, the engine 102 may be used to drive other mechanical assemblies such as compressors. In one embodiment, the engine 102 may be a reciprocating engine 102. In another embodiment, the engine 102 may be a rotary engine 102. In an embodiment, the engine 102 may be a two stroke internal combustion engine 102. In another embodiment, the engine 102 may be a four stroke internal combustion engine 102.

In an embodiment, the engine 102 may be configured to operate on varying thermodynamic cycles. In one embodiment, the engine 102 may be configured to operate on a diesel combustion cycle. Accordingly, the engine 102 may use any compression ignited fuel that is compatible with the diesel combustion cycle, for example, diesel. In another embodiment, the engine 102 may be configured to operate on an Otto cycle. Therefore, in this embodiment, the engine 102 may use any spark ignited fuel compatible with the Otto cycle, for example, gasoline, natural gas, synthesis gas (syngas).

As shown in FIG. 1, the engine 102 includes a fuel delivery system 106 and an ignition source 108. The fuel delivery system 106 is configured to deliver at least one of the compression ignited fuel and the spark ignited fuel. In an embodiment, the ignition source 108 is configured to ignite the spark ignited fuel. The control system 104 is operatively connected to the engine 102 and includes a detector 110, a processor 112, and at least one actuator 114. The detector 110 is configured to sense a signal 116 to change from the compression ignited fuel to the spark ignited fuel. In an embodiment, the signal 116 may be triggered by an operator input from a manual selector switch (not shown). In another embodiment, the signal 116 may be a feedback signal from an auxiliary detector (not shown) based on instantaneous operating conditions of the engine 102.

The processor 112 is configured to receive the signal 116 from the detector 110 and generate an actuation signal 118. The actuator 114 is configured to receive the actuation signal 118, vary an operating speed of the engine 102, and selectively control at least one of the fuel delivery system 106 and the ignition source 108. In an embodiment, the detector 110 may be configured to sense a signal 116 to change a fuel type from diesel to natural gas.

A transition of fuel type from the compression ignited fuel to the spark ignited fuel in the engine 102 will be explained in the appended description pertaining to FIGS. 2-17. For the purposes of understanding the various embodiments of the present disclosure, explanation will be made with regards to a four stroke internal combustion engine 102 as illustrated in FIGS. 2-17. Further, horizontal arrows between each of the engines 102 illustrated in FIGS. 2-17 may be construed to represent a series of successive strokes executed in the engine 102. Furthermore, a symbolic representation made to reactants and products in FIGS. 2-17 is shown in the table below.

| Reactants/Products | Symbol |
|---|---|
| Compressed ignited fuel (e.g. Diesel) | ● |
| Air | ○ |
| Spark ignited fuel (e.g. Gasoline/Natural gas) | ■ |
| By-products | ▲ |

In an embodiment as shown in FIGS. 2-17, the engine 102 may include a piston 120, a combustion chamber 122, and a crank 124. The piston 120 may be configured to reciprocate within the combustion chamber 122 and rotate the crank 124. The engine 102 may further include an air inlet valve 126, and an exhaust valve 128. The air inlet valve 126 may be configured to supply air into the combustion chamber 122 while the exhaust valve 128 may be configured to expel by-products resulting due to combustion of fuel. For the purposes of clarity in understanding the present disclosure, vertical arrows illustrated in FIGS. 2-17 may indicate a direction of travel of the piston 120, upwards or downwards, in the combustion chamber 122 for the respective strokes.

In an embodiment as shown in FIGS. 2-17, the fuel delivery system 106 may include an injector 130, and a fuel valve 132. In an embodiment, the injector 130 may be configured to deliver varying amounts of compression ignited fuel into the combustion chamber 122. In one embodiment, the injector 130 may be configured deliver an increased amount of compression ignited fuel into the combustion chamber 122. In an embodiment, the fuel delivery system 106 may further include a micro-pilot injector configured to deliver a decreased amount of compression ignited fuel into the combustion chamber 122, for example, 1%-5% of the compression ignited fuel delivered by the injector 130. In an alternative embodiment, the injector 130 may be configured to deliver the decreased amount of compression ignited fuel into the combustion chamber 122.

The fuel valve 132 may be configured to deliver varying amounts of the spark ignited fuel into the combustion chamber 122. In an embodiment, the fuel valve 132 may be configured to deliver natural gas into the combustion chamber 122. In other embodiments, the fuel valve 132 may be configured to deliver synthetic gas, gasoline or other spark ignited fuels commonly known in the art.

In an embodiment as shown in FIGS. 2-17, the ignition source 108 may be a spark plug configured to ignite the spark ignited fuel present in the combustion chamber 122. In another embodiment, the injector 130 may be further configured to ignite the fuel present in the combustion chamber 122. Hence, in various embodiments of this disclosure, a nature of function executed by the injector 130 may be based on a cycle occurring in the combustion chamber 122 at a particular instant of time. Therefore, it is to be understood that while referencing the injector 130 in the disclosure herein, the injector 130 may fall under the purview of one or both of the fuel delivery system 106 and the ignition source 108 based on the nature of function/s executed by the injector 130.

FIGS. 2-5 illustrate the engine 102 in an intake stroke 202, a compression stroke 302, a power stroke 402, and an exhaust stroke 502 respectively. In an embodiment as shown in FIGS. 2-5, the engine 102 may be operating on the compression ignited fuel, for example, diesel. Referring specifically to FIG. 2, air may be drawn into the combustion chamber 122 via the air inlet valve 126. Referring to FIG. 3, the piston 120 may compress the air beyond an ignition temperature of the compression ignited fuel. Referring to FIG. 4, the processor 112 may be configured to generate the actuation signal 118 based on the signal 116 sensed by the detector 110. The actuator 114 may be configured to receive the actuation signal 118 and selectively control the fuel delivery system 106 by switching on the injector 130 of the fuel delivery system 106. Therefore, diesel may be drawn into the combustion chamber 122 via the injector 130 while the subsequent diesel-compressed air mixture may be combusted to produce power in the power stroke 402. As a result of the combustion process, heat and energy may be produced. Further, by-products may be produced as shown in FIG. 4. The by-products may include one or more of unburned diesel, partially cracked hydro-carbon molecules, nitrous-oxides (NOx), free radicals such as hydroxyl (OH$^-$) or hydrogen (H$^+$), particulate matter (a matrix of carbon and volatile organic compounds), sulfuric acid, and nitric acid. Further, a temperature of these by-products may be hot. As known to one having ordinary skill in the art, the aforesaid by-products and their temperatures may hamper a transitioning of fuel type from the compression ignited fuel to the spark ignited fuel. Referring to FIG. 5, the piston 120 travels upwards to forcibly exhaust the by-products. However, some of the by-products may typically be left behind in the combustion chamber 122. Therefore, these by-products may need to be exhausted in order to make the combustion chamber 122 conducive to ignition conditions of the spark ignited fuel.

FIGS. 6-9 illustrate the engine 102 in an intake stroke 602, a first idle stroke 702, a second idle stroke 802, and an exhaust stroke 902 respectively. As evident from FIG. 6, some of the residual by-products from the preceding exhaust stroke 502 may be carried into the subsequent intake stroke 602. In an embodiment, the actuator 114 may be configured to shut off a delivery of the compression ignited fuel from the fuel delivery system 106 to the engine 102 for one or more motoring cycles 602, 702, 802, and 902 of the engine 102. The motoring cycles disclosed herein may collectively refer to the intake stroke 602, the first idle stroke 702, the second idle stroke 802, and the exhaust stroke 902 of FIGS. 6-9. Alternatively, the motoring cycle disclosed herein may refer to the intake stroke 602 of FIG. 6. Therefore, in the intake stroke 602 of FIG. 6, the actuator 114 may be configured to shut off a delivery of the compression ignited fuel from the fuel injector 130 of the fuel delivery system 106 thereby allowing only air to be drawn into the engine 102 through the air inlet valve 126. Referring to FIG. 7, the piston 120 may travel upwards to compress a mixture of residual by-products and air. Although it may not be readily obvious to one having ordinary skill in the art, some ignitable portion of the residual by-products may be present in the combustion chamber 122 from the previous exhaust stroke 502. This ignitable portion may be combusted in the first idle stroke 702. Conversely, it should also be noted that in some cases all of the by-products may be un-ignitable thereby entailing the piston 120 to undergo a pure reciprocal action within the combustion chamber 122. Referring to FIG. 8, the piston 120 may travel downwards. Referring to FIG. 9, the piston 120 may travel upwards to forcibly exhaust the by-products and the air.

It may be evident from the present disclosure that the motoring cycle 602, 702, 802, and 902 shown in FIGS. 6-9 occurs in the absence of any fresh diesel. It may be noted here that power produced in the power stroke 402 of FIG. 4 may manifest itself as inertia in the crank 124. This inertia may allow the engine 102 to execute the strokes 602, 702, 802, and 902 in the absence of any fresh diesel as shown in FIGS. 6-9.

Further, in an embodiment, the actuator 114 may be configured to increase an amount of the compression ignited fuel delivered to the engine 102 prior to the motoring cycles 602, 702, 802, and 902 of the engine 102. As shown in FIGS. 10-13, a larger amount of diesel may be injected into the combustion chamber 122 of the engine 102 at stroke 1002. Therefore, the operating speed of the engine 102 may consequently increase and entail an increase in the amount of inertia at the crank 124. This increased amount of inertia may help the engine 102 tide over the motoring cycles 602, 702, 802, and 902 of FIGS. 6-9 by forcibly reciprocating the piston 120 in the absence of diesel from these cycles 602, 702, 802, and 902. However, it must be understood that strokes 1002, 1102, 1202, and 1302 occur after strokes 202, 302, 402, and 502 but precede strokes 602, 702, 702 and 802 in order to produce increased inertia in the crank 124 and allow the engine 102 to tide over the motoring cycles 602, 702, 802, and 902.

FIGS. 14-17 illustrate the engine 102 in an intake stroke 1402, a compression stroke 1502, a compression ignited fuel intake stroke 1602, and an exhaust stroke 1702 respectively. In an embodiment as shown in FIG. 14, the actuator 114 may be configured to switch on a delivery of the spark ignited fuel from the fuel delivery system 106 to the engine 102 after the motoring cycles 602, 702, 802, and 902 of the engine 102. Therefore, in the intake stroke 1402, the actuator 114 may be configured to switch on the fuel valve 132 of the fuel delivery system 106.

Referring to FIG. 15, the piston 120 may travel upwards to execute the compression stroke 1502 of the engine 102. In an embodiment, the actuator 114 may be configured to selectively control the ignition source 108. Hence, the ignition source 108 may be controlled to combust the spark ignited fuel-air mixture. Further, as evident from FIG. 16, by-products may be produced as a result of the compression stroke 1502.

In another embodiment, the actuator 114 may be configured to switch on a delivery of the compression ignited fuel from the fuel delivery system 106 after the motoring cycles 602, 702, 802, and 902. Therefore, as shown in stroke 1602 of FIG. 16, diesel may be injected into the combustion chamber 122 via the injector 130. In an embodiment, the compression of the compression ignited fuel in stroke 1602 may provide ignition to the spark ignited fuel injected in stroke 1402. In another embodiment as shown in FIG. 16, the spark ignited fuel may be ignited by an ignition source 108 such as a spark plug. In other embodiments, other ignition sources 108 commonly known in the art may be used to provide ignition to the compression ignited fuel.

Referring to FIG. 17, the engine 102 may exhaust by-products produced as a result of combusting the spark ignited fuel. Subsequent strokes of the engine 102 may be accomplished thereafter while operating on the spark ignited fuel.

INDUSTRIAL APPLICABILITY

FIG. 18 shows a method 1800 of changing a fuel type in the engine 102. At step 1802, the method 1800 includes allowing delivery of a compression ignited fuel into the engine 102. At step 1804, the method 1800 includes igniting the compression ignited fuel in the engine 102. At step 1806, the method 1800 includes sensing a signal 116 to change a fuel type. At step 1808, the method 1800 includes processing the signal 116 to generate an actuation signal 118. At step 1810, the method 1800 includes varying an operating speed of the engine 102 based on the actuation signal 118. At step 1812, the method 1800 includes selectively controlling one or more of a fuel delivery system 106 and an ignition source 108 of the engine 102 based on the actuation signal 118.

In an embodiment, selectively controlling the fuel delivery system 106 may include shutting off a delivery of the compression ignited fuel from the fuel delivery system 106 to the engine 102 for the one or more motoring cycles 602, 702, 802, and 902 of the engine 102. In another embodiment, selectively controlling the fuel delivery system 106 may include increasing an amount of the compression ignited fuel delivered to the engine 102 prior to the one or more motoring cycles 602, 702, 802, and 902 of the engine 102. In an embodiment, varying an operating speed of the engine 102 may include increasing an operating speed of the engine 102. In another embodiment, selectively controlling the fuel delivery system 106 may include switching on a delivery of the spark ignited fuel from the fuel delivery system 106 to the engine 102 after the motoring cycles 602, 702, 802, and 902 of the engine 102. In an embodiment, selectively controlling the ignition source 108 may include switching on the ignition source 108 after the one or more motoring cycles 602, 702, 802, and 902 of the engine 102.

Conventional changeover systems for engines may allow a change in fuel type input to the engine 102. However, in specific cases, when transitioning from a compression ignited fuel, such as diesel, to a spark ignited fuel, such as gasoline or natural gas, residual by-products resulting from the combustion of the compression ignited fuel may be left behind in a combustion chamber 122 of the engine 102. Typically, pre-ignition characteristics of spark ignited fuels may be different from that of compression ignited fuels. The residual by-products left behind in the combustion chamber 122 of the engine 102 may cause detrimental effects such as knocking, or detonation from pre-ignition of the spark ignited fuel. Thus, the residual by-products may negatively impact transitioning from compression ignited fuels to spark ignited fuels within the engine 102 and deteriorate engine performance.

In the power system 100 of the present disclosure, the motoring cycles 602, 702, 802, and 902 may be implemented between the exhaust stroke 502/1302 and the intake stroke 1402. The exhaust stroke 902 may exhaust most or all of the residual by-products left behind after the exhaust stroke 502. Therefore, the motoring cycles 602, 702, 802, and 902 may prepare or make the combustion chamber 122 conducive for ignition of spark ignited fuel. Hence, transitioning a fuel type from compression ignited fuel to spark ignited fuel in the engine 102 may entail minimal knocking, or detonation from pre-ignition of the spark ignited fuel. Therefore, the engine 102 may effect a smooth transition from a compression ignited fuel to a spark ignited fuel. Further, a minimization in occurrence of the aforesaid detrimental effects may improve engine performance and may prolong engine life.

While aspects of the present disclosure have been particularly shown and described with reference to the embodiments above, it will be understood by those skilled in the art that various additional embodiments may be contemplated by the modification of the disclosed machine, systems and methods without departing from the spirit and scope of what is disclosed. Such embodiments should be understood to fall within the scope of the present disclosure as determined based upon the claims and any equivalents thereof.

We claim:

1. A control system for an engine including a fuel delivery system and an ignition source, the control system including:
    a detector configured to sense a signal to change from a compression ignited fuel to a spark ignited fuel;
    a processor configured to receive the signal from the detector and generate an actuation signal; and
    at least one actuator configured to receive the actuation signal, increase an operating speed of the engine in response to the actuation signal, and selectively control at least one of the fuel delivery system and the ignition source.

2. The control system of claim 1, wherein the actuator is configured to shut off a delivery of the compression ignited fuel from the fuel delivery system to the engine for one or more motoring cycles of the engine.

3. The control system of claim 2, wherein the actuator is configured to increase an amount of the compression ignited fuel delivered to the engine prior to the one or more motoring cycles of the engine.

4. The control system of claim 1, wherein the actuator is configured to switch on a delivery of the spark ignited fuel from the fuel delivery system to the engine after one or more motoring cycles of the engine.

5. The control system of claim 4, wherein the actuator is configured to switch on the ignition source after the one or more motoring cycles of the engine.

6. The control system of claim 1, wherein the actuator is configured to switch on a delivery of the compression ignited fuel from the fuel delivery system to the engine after one or more motoring cycles of the engine.

7. A power system including:
    an engine including:
    a fuel delivery system configured to deliver at least one of a compression ignited fuel and a spark ignited fuel; and
    an ignition source configured to ignite one or more of the two fuel types; and
    a control system operatively connected to the engine, the control system including:
        a detector configured to sense a signal to change from the compression ignited fuel to the spark ignited fuel;
        a processor configured to receive the signal from the detector and generate an actuation signal; and
        at least one actuator configured to receive the actuation signal, increase an operating speed of the engine in response to the actuation signal, and selectively control at least one of the fuel delivery system and the ignition source.

8. The power system of claim 7, wherein the actuator is configured to shut off a delivery of the compression ignited fuel from the fuel delivery system to the engine for one or more motoring cycles of the engine.

9. The power system of claim 8, wherein the actuator is configured to increase an amount of the compression ignited fuel delivered to the engine prior to the one or more motoring cycles of the engine.

10. The power system of claim 7, wherein the actuator is configured to switch on a delivery of the spark ignited fuel from the fuel delivery system to the engine after one or more motoring cycles of the engine.

11. The power system of claim 10, wherein the actuator is configured to switch on the ignition source after the one or more motoring cycles of the engine.

12. The power system of claim 7, wherein the actuator is configured to switch on a delivery of the compression ignited fuel from the fuel delivery system to the engine after one or more motoring cycles of the engine.

13. A method of changing a fuel type in an engine, the method including:
    allowing delivery of a compression ignited fuel into the engine;
    igniting the compression ignited fuel in the engine;
    sensing a signal to change a fuel type;
    processing the signal to generate an actuation signal;
    increasing an operating speed of the engine in response to the actuation signal;
    selectively controlling one or more of a fuel delivery system and an ignition source of the engine based on the actuation signal; and
    allowing delivery of a spark ignited fuel into the engine.

14. The method of claim 13, wherein selectively controlling the fuel delivery system includes shutting off a delivery of the compression ignited fuel from the fuel delivery system to the engine for one or more motoring cycles of the engine.

15. The method of claim 14, wherein selectively controlling the fuel delivery system includes increasing an amount of the compression ignited fuel delivered to the engine prior to the one or more motoring cycles of the engine.

16. The method of claim 13, wherein selectively controlling the fuel delivery system includes switching on a delivery of a spark ignited fuel from the fuel delivery system to the engine after one or more motoring cycles of the engine.

17. The method of claim 16, wherein selectively controlling the ignition source includes switching on the ignition source after the one or more motoring cycles of the engine.

* * * * *